United States Patent [19]

Shaffer

[11] Patent Number: 5,570,372
[45] Date of Patent: Oct. 29, 1996

[54] MULTIMEDIA COMMUNICATIONS WITH SYSTEM-DEPENDENT ADAPTIVE DELAYS

[75] Inventor: Shmuel Shaffer, Palo Alto, Calif.

[73] Assignee: Siemens Rolm Communications Inc., Santa Clara, Calif.

[21] Appl. No.: 555,567

[22] Filed: Nov. 8, 1995

[51] Int. Cl.$^6$ ................................................. H04N 7/13
[52] U.S. Cl. ........................... 370/108; 348/518; 348/515
[58] Field of Search ..................................... 370/108, 102, 370/100.1, 105.1, 110.1, 112; 348/512, 518, 423, 515, 914, 614; 375/354, 372

[56] References Cited

U.S. PATENT DOCUMENTS

| | | | |
|---|---|---|---|
| Re. 33,535 | 2/1991 | Cooper | 348/423 |
| 5,231,492 | 7/1993 | Dangi et al. | 348/17 |
| 5,231,649 | 7/1993 | Duncanson | 375/38 |
| 5,263,025 | 11/1993 | Torii et al. | 370/94.2 |
| 5,467,139 | 11/1995 | Lankford | 348/512 |
| 5,481,543 | 1/1996 | Veltman | 370/94.1 |

Primary Examiner—Douglas W. Olms
Assistant Examiner—Ajit Patel

[57] ABSTRACT

A method and system in which lip synchronization is restricted to a single system in a multiple system communication of video data and audio data. In the preferred embodiment, the receiving system synchronizes video and audio signals for presentation. The originating system forms and processes video and audio signals separately. For many systems, the processing involves dissimilar delays. Consequently, when the information is transmitted through a network to the receiving system, the video and audio data is nonsynchronous. The originating system provides delay information that is indicative of the dissimilarity of video and audio processing time at the originating system. The delay information is utilized at the receiving system to determine an adaptive compensation delay for introduction at the appropriate video or audio processing path. By providing a single compensation delay for multi-system communications, the total delay is potentially reduced.

17 Claims, 2 Drawing Sheets

MULTIMEDIA COMMUNICATIONS WITH SYSTEM-DEPENDENT ADAPTIVE DELAYS

DESCRIPTION

1. Technical Field

The invention relates generally to wide-band and narrow-band multimedia communications and more particularly to reducing delay in the presentation of audio-visual communication from one system to a remote system.

2. Background Art

There are a number of applications in which audio and video signals generated at a first system are transmitted to a second system via a public or private network. For example, audio-visual communications are required for the use of video phones and video conferences.

In the communication between a pair of visual telephone systems, each system typically includes video input/output equipment such as cameras and monitors, and includes audio input/output equipment, such as microphones and loudspeakers. In order to reduce the bandwidth required for communication, the video and audio signals from the input/output equipment are digitized and compressed. Encoded signals are then multiplexed into a single bit stream for transmission through the network to a target system. The single bit stream will also include data and control signals. Since the target system may not be the same as the originating system, some standardization is necessary. Within the field of visual telephone systems, the International Telecommunication Union (ITU) provides a recommended standard for narrow-band telecommunications. The standard is referred to as ITU-T Recommendation H.320, wherein narrow-band is defined as a range of 64 kbit/s to 1920 kbit/s.

Lip synchronization at the presentation of information at the target system requires that there be a synchronization of the processing of video data and audio data. In the network transmission from an originating system of information to a target system, the information is reduced to a single bit stream, so that the video and audio data delay is uniform. However, at both the originating system and the target system, the video and audio signals are processed separately. Within each of the two systems linked by the network, the video data typically undergoes processing separately from the audio data. For example, at the originating system, there may be parallel video and audio paths in which the separate signals are digitized and compressed (i.e., encoded). At the target system, the video and audio signals are again separated and processed along separate paths. The total delay from the capture of information at the originating system to the presentation of the information at the target system is the combination of the two system delays and the network delay.

Processing and transmission delays degrade the quality of telecommunications. The network component of total delay is not within the control of system designers. At the system level, delays at the source and the target can be reduced by increasing the speed of the encoder/decoder pair at each of the networks. The maximum speed is limited by the slower of the audio processing and video processing. For example, at the originating system, audio processing may be less complex and time consuming than video processing. A delay is then intentionally added at the audio processing path to provide synchronization of video and audio data for transmission via the network. In like manner, a delay may be intentionally added along the video or audio processing paths of the receiving system in order to ensure synchronization upon presentation.

What is needed is a video/audio synchronization method for improving performance for intersystem communications, such as communication between two visual telephone systems. What is also needed is a system for implementing the synchronization without a significant increase in equipment expense.

SUMMARY OF THE INVENTION

A method of synchronizing video data and audio data for communication between remote systems includes intersystem exchange of data regarding the relative timing of video processing and audio processing. A compensation delay is introduced at only one of the systems, with the compensation delay being based upon the sums of the delays at the two systems. Whether the compensation delay is introduced at the originating system or the target system, the video and audio data will be unsynchronized in the network transmission between the two systems.

In the preferred embodiment, the compensation delay is introduced at the target system. Video and audio signals are generated at the originating system. As an example, a camera may be used to generate the video signal and a microphone may be used to generate the audio signal. The separate signals undergo processing along different video and audio paths. For example, each signal may be digitized and compressed, i.e. encoded.

During processing of the separate video and audio signals, each signal will be delayed relative to the generation of the signals. In many systems, the two delays will be dissimilar. Rather than adding a system-unique compensation delay, delay data indicative of the dissimilarity is generated at the originating system and is transmitted to the target system. The intersystem compensation delay is added at the receiving system. The compensation is adaptive, since the magnitude of compensation is based upon both the dissimilarity of delays at the originating system and the dissimilarity of audio and visual delays at the receiving system. Upon response to the original transmission, a similar exchange of delay data is implemented in order to allow the adaptive compensation to be performed at the previously originating system.

For most telecommunication systems, the difference between the delays of video encoding and audio encoding is generally fixed. Therefore, the exchange of delay data between the two systems may be a single exchange. However, the invention may be used with systems in which delays are variable, so that the transmitted delay data is dynamic. The delay data may be a single value that corresponds to the difference in the two delays. In such an implementation, the value may be positive or negative, depending upon whether the video delay exceeds or is exceeded by the audio delay.

A system that employs the method includes an adaptive compensation delay circuit. System-unique delay data is received from a remote system. Nonsynchronized video and audio data are also received from the remote system. Lip synchronization is achieved for the nonsynchronized video and audio data by utilizing the system-unique delay data from the remote site in combination with the difference in video and audio delay at the receiving system to calculate the necessary compensation delay.

While the preferred embodiment incorporates the compensation delay at the receiving site, this is not critical. The transmitting system may provide overcompensation for its communications upon receiving system-unique delay data from a receiving site. Whether the adaptive compensation is exercised at the transmitting site or the receiving site, the method and system carry the potential of reducing the total delay of signal transmission and presentation. For example, if the video encoding delay exceeds the audio encoding delay, but video decoding is exceeded in time by audio decoding, the method of adaptive compensation will lead to a reduction in the total delay, relative to prior art techniques. Likewise, if the video encoding is exceeded by audio encoding, but video decoding exceeds audio decoding, the total delay is reduced. One advantage of a reduction in presentation delay is that the quality of the communication is enhanced. For the present invention, this enhancement is realized without a substantial increase in equipment cost.

BEST MODE FOR CARRYING OUT THE INVENTION

Figure 1:
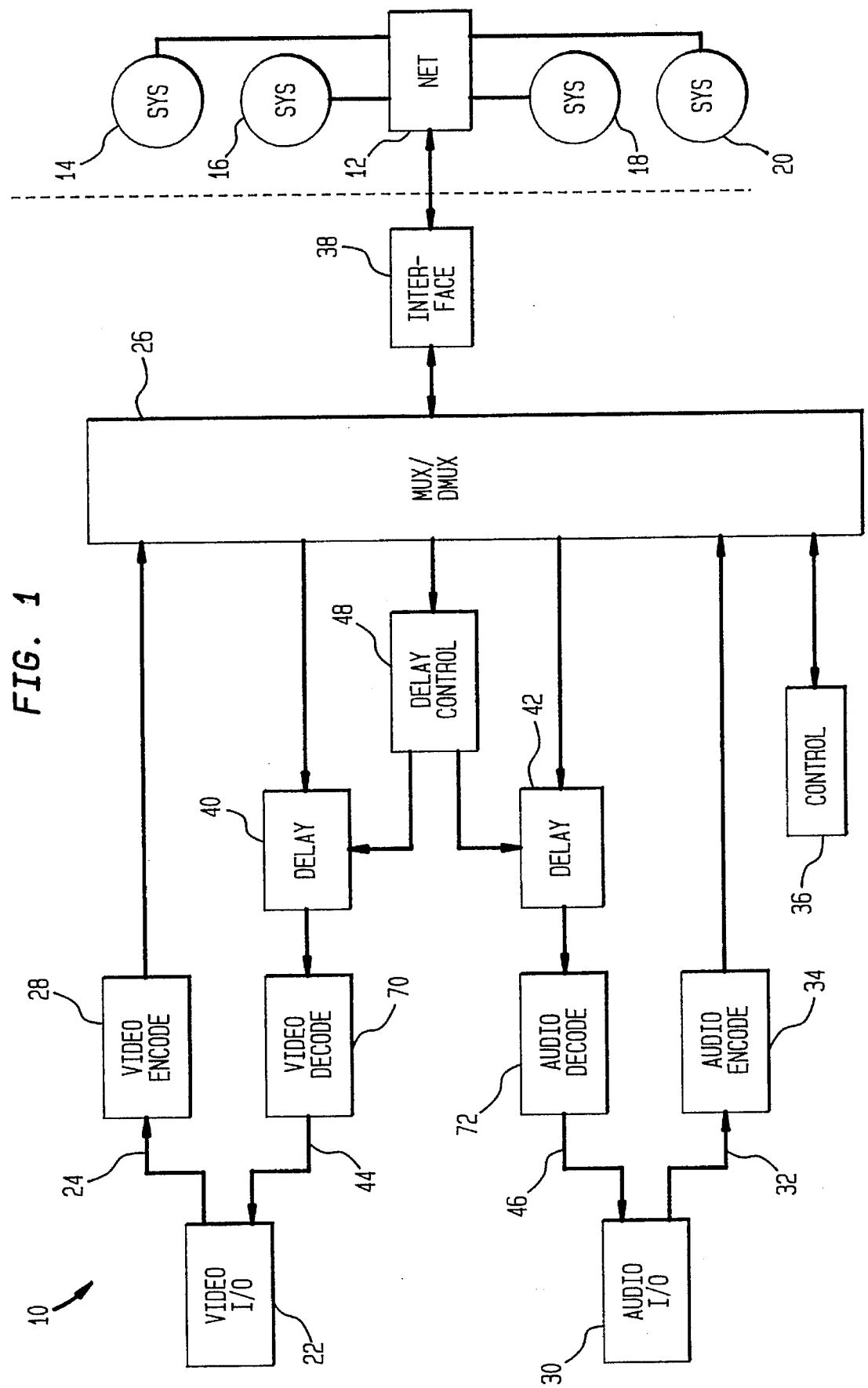
FIG. 1 is a block diagram of a system having adaptive compensation delay in accordance with the invention.

With reference to FIG. 1, a visual telephone system 10 is shown as being connected to a network 12 for visual and audio communication with other visual telephone systems 14, 16, 18 and 20 at remote sites. While the invention is illustrated as being used in teleconferencing and the like, the invention may be used in other applications of transmitting video and audio signals among systems at different sites.

The visual telephone system 10 includes video input/output equipment 22. The equipment may simply be a camera and a monitor, but other devices are presently used. Images are conducted through a video path 24 to a multiplexer/demultiplexer unit 26. The path includes a video encoder 28. The video encoder filters out redundancy reduction coding. That is, video signals are digitized and compressed to reduce the required bandwidth for transmission of data via the network 12. The operation of the encoder 28 is well known in the art, and is not critical to the invention.

The system 10 also includes audio input/output equipment 30. This equipment may merely be a microphone and a loudspeaker. On the other hand, the equipment may include more sophisticated devices, such as acoustic echo cancellation circuitry. The output of the equipment follows an audio processing path 32 to the multiplexer/demultiplexer unit 26. An audio encoder 34 performs the same functions on the audio output signals that the video encoder 28 performs on the video output signals.

While not shown in FIG. 1, there are typically other signal inputs to the multiplexer/demultiplexer unit 26. Telematic equipment may be included. For example, an electronic blackboard may be included to enhance communication.

A control unit 36 is also connected to the multiplexer/demultiplexer unit 26. The control unit exchanges signals with the network 12 and with remote systems 14–20. System-to-system control signals establish common modes of operation and signaling, as is well known in the art.

The multiplexer/demultiplexer unit 26 reduces video, audio, data and control signals into a single bit stream for transmission. The transmission may be a narrow-band service or a wide-band service. In telecommunications, the narrow-band service is one having a bit rate within the range of 64 kbit/s to 1920 kbit/s. The single bit steam is received at a network interface 38 that exercises the necessary adaptations between the system terminal and the network 12. Intercommunications may be by any known means. For example, the system 10 may be a visual telephone while the remote system 14 may be an integrated services digital network (ISDN) phone. The audio signals require continuous traffic and real-time transmission. Likewise, the video signals are continuous traffic. The bit rate allocated to video signals should be as high as possible, so as to maximize the quality of the communication for a given channel capacity.

Video and audio output signals along processing paths 24 and 32 will experience some delay. Typically, there is a difference in the delay, even though the processing functions are basically equivalent. In prior art systems, a delay circuit is included along the processing path 24 and 32 that introduces the shorter delay during the encoding process. This intentional delay synchronizes the video and audio signals for transmission to one or more of the remote systems 14–20. A similar delay equalization is performed at the receiving system, so that the presentation of video and audio information is in lip synchronization. In comparison to the prior art techniques, the system 10 includes delay circuits 40 and 42 only along a video input path 44 and an audio input path 46. Thus, the transmission of audio-visual information from the output processing lines 24 and 32 will be nonsynchronous. The delay circuits 40 and 42 do not introduce a fixed delay, but instead are adaptive. The adaptive delay circuits are controlled by a delay control unit 48.

Figure 2:
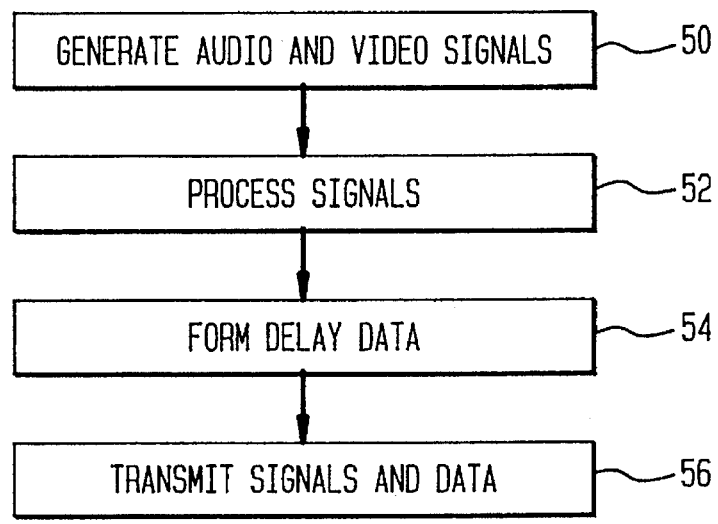
FIG. 2 is an illustration of one embodiment for carrying out transmission steps in accordance with the invention.

Referring now to FIGS. 1 and 2, in the operation of the visual telephone system 10, audio and video signals are generated at step 50 using the input/output equipment 22 and 30. At step 52, the signals are encoded. Typically, there will be a fixed temporal relationship between encoding the video signal and encoding the audio signal. That is, the delays imposed by processing along paths 24 and 32 will remain generally the same during operation of the system. As previously noted, there is typically a dissimilarity between video and audio encoding along the paths. In order to establish signal synchronization, so as to allow receiving systems to provide a lip-synchronized presentation, prior art systems introduce a delay along the faster of the two paths 24 and 32. On the other hand, the system 10 of FIG. 1 does not provide delay compensation to either of these two paths.

In step 54, delay data is generated. The delay data is indicative of the dissimilarity in the encoding delay along video processing path 24 and the encoding delay along audio processing path 32. For systems in which the dissimilarity is fixed, the control unit 36 may be used to generate the delay data on a one-time basis. However, there may be applications in which the delays are dynamic, so that the delay data varies depending upon circumstances. In its simplest form, the delay data is a value having a magnitude corresponding to the extent of the time difference between the delays of the two paths. The polarity of the magnitude may be used to designate which path is the faster path and which path is the slower path. For example, a positive number may identify that the video encoding is executed more quickly than the audio encoding, while a negative number indicates the opposite.

In step 56, the signals and the data are transmitted. In FIG. 1, the signals and data are multiplexed into a single bit stream for transmission along the network 12 to one or more of the systems 14–20. The single bit stream will contain all of the signals and data of the conventional systems, but will also include the delay data.

Figure 3:
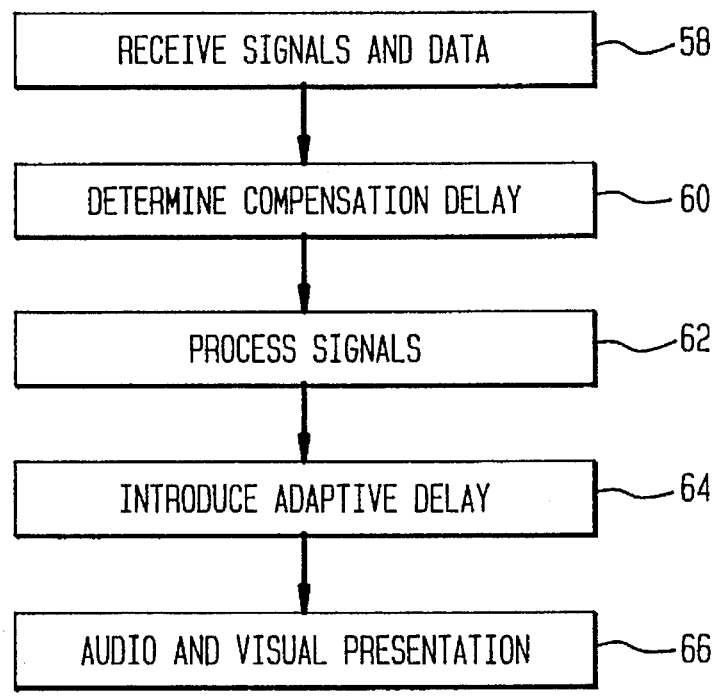
FIG. 3 is an illustration of receiving steps for the embodiment of FIG. 2.

Referring now to FIGS. 1 and 3, if the system 10 is considered to be the receiving system, the steps of FIG. 3 are followed. In step 58, the video, audio and control signals are received from one of the remote sites 14–20. Also received is delay data relating to the relationship of the video and audio information. Unless the remote system is one in which video and audio signals are processed with equal delay, the video and audio information will be nonsynchronous. Again, the delay data may have a magnitude indicative of the nonsynchronization, and may have a polarity indicative of which of the audio and video signals receive the greater delay during the encoding of the signals at the remote site.

In step 60, the adaptive compensation delay is determined according to an algorithm to be described below. Fundamentally, the compensation delay is calculated to be the sum of the delay dissimilarities at the transmitting system and the receiving system. That is, the received delay data from the remote system 14–20 is added to the dissimilarity in decoding the video and audio signals within the receiving system 10. The delay control circuit 48 of FIG. 1 adjusts the appropriate adaptive delay circuit 40 and 42 to provide lip synchronization. The nonsynchronized video and audio received at the multiplexer/demultiplexer unit 26 is synchronized by means of the adaptive delay scheme. The result is a potential reduction in presentation delay. For example, if the audio encoding of a transmitting system has a delay greater than that of video encoding, but the receiving system has an opposite synchronization need, the adaptive delay approach will reduce the total presentation delay, relative to conventional system-to-system presentations. Likewise, if the video encoding delay of the transmitting system is greater than the audio encoding delay, but the receiving system has an audio decoding delay that exceeds the video decoding delay, the total presentation delay will be reduced. Since the presentation delay is a factor in the quality of audio-visual communication, the reduction in presentation delay will enhance the quality.

The video input path 44 of FIG. 1 includes a video decoder 70. The video decoder performs the reverse functions of the video encoder 28. The output from the video decoder may be an uncompressed analog signal.

The audio input path 46 includes an audio decoder 72. The decoder decompresses the audio signal and provides an appropriate analog or digital signal for operation of the audio input/output equipment 30.

In FIG. 3, the signal processing step 62 and the adaptive delay step 64 are performed by the decoders 70 and 72 and the appropriate delay 40 or 42. The visual and audio presentation at step 66 is provided by the input/output equipment 22 and 30. While the adaptive delay is shown as being provided prior to the video and audio decoding, this is not critical. Lip synchronization can also occur by providing the delay subsequent to decoding the signals.

In yet another embodiment, the adaptive delay occurs at the video and audio processing output paths 24 and 32. In this embodiment, the receiving remote system 14–20 provides delay data indicative of the dissimilarity of video and audio delay that will be encountered upon reception of signals. In this embodiment, there will be no delay circuits 40 and 42 along the input paths 44 and 46. Nevertheless, the basic operation will be the same, since the delay dissimilarities are summed in order to provide lip synchronization. Moreover, in each embodiment, the video and audio information is nonsynchronous when transmitted along the network 12.

For both conventional audio-visual communications between systems and communications using the structure and method described above, total delay is the sum of delay at the originating system, the delay introduced by transmission to the network, and delay caused by the target system 14–20. For conventional approaches, the delay at the originating system will be the greater of audio decoding delay and video encoding delay, since the faster processing time is intentionally delayed in order to provide a lip synchronized signal to the receiving system. Then, at the receiving system, the delay will be the greater of the video decoding delay and the audio decoding delay. A second compensation delay is provided at the receiving system. The invention is to provide a single compensation delay by allowing only one of the systems to perform lip synchronization.

Using either the conventional method or the method of FIGS. 2 and 3, the delay of audio-visual information introduced from the input of the encoding circuitry to the output of the decoding circuitry is equal to the delays caused at the originating and receiving systems and the delay caused by the network. That is, the total presentation delay is as follows:

$$\text{Delay}_{total} = \text{Delay}_{encode} + \text{Delay}_{net} + \text{Delay}_{decode} \quad (1)$$

Using the prior art technique, the delay caused by the encoding circuitry of the originating system is the greater of the delays for visual encoding ($\text{Delay}_{encode}^{visual}$) and audio encoding ($\text{Delay}_{encode}^{audio}$). The conventional technique is to provide only lip synchronized signals to the network, so that the slower of the two encoding circuits determines the delay. That is:

$$\text{Delay}_{encode} = \text{Max}\{\text{Delay}_{encode}^{visual}, \text{Delay}_{encode}^{audio}\} \quad (2)$$

Also according to conventional techniques, lip synchronization is provided at the receiving system by intentionally introducing a delay at the faster of visual decoding and audio decoding. Consequently, the delay at the conventional receiving system is the greater of visual decoding delay ($\text{Delay}_{decode}^{visual}$) and audio decoding delay ($\text{Delay}_{decode}^{audio}$), i.e.:

$$\text{Delay}_{decode} = \text{Max}\{\text{Delay}_{decode}^{visual}, \text{Delay}_{decode}^{audio}\} \quad (3)$$

The method of FIGS. 2 and 3 is not subject to the limitations of Equations (2) and (3). Rather than the two systems providing a delay equal to the sum of Equations (2) and (3), implementation of the invention provides a delay that is the greater of either the sum of delays for visual encoding and decoding or the sum of delays for audio encoding and decoding. That is:

$$\text{Delay}_{systems} = \text{Max}\{\text{Delay}_{encode}^{visual} + \text{Delay}_{decode}^{visual}, \text{Delay}_{encode}^{audio} + \text{Delay}_{decode}^{audio}\} \quad (4)$$

The conventional method is to provide separate compensation delays at the originating system and the receiving system, so that Equations (2) and (3) are relevant. On the other hand, in the system of FIG. 1, only the input paths 44 and 46 include delay circuits 40 and 42. The delay circuits are adaptive delays and are controlled by delay control unit 48. While each of the two input paths includes a delay circuit, only one delay will be used for lip synchronization of a given audio-visual communication. The adaptive compensation delay will be the difference between the total delay for visual encoding and decoding and total delay for audio encoding and decoding, i.e.:

$$\text{Delay}_{compensation}^{adaptive} = (\text{Delay}_{encode}^{visual} + \text{Delay}_{decode}^{visual}) - (\text{Delay}_{encode}^{audio} + \text{Delay}_{decode}^{audio}) \quad (5)$$

In the operation of the system and method of FIGS. 1–3, the adaptive compensation delay will actually be determined as follows:

$$\text{Delay}_{compensation}^{adaptive} = (\text{Delay}_{encode}^{visual} - \text{Delay}_{encode}^{audio}) + (\text{Delay}_{decode}^{visual} - \text{Delay}_{decode}^{audio}) \quad (6)$$

The first difference of Equation (6) (i.e., the encoding difference) establishes the data delay that is transmitted from the originating system to the receiving system. The data delay received at the receiving system is added to the second difference (i.e. the decoding delay difference) that is set forth in Equation (6). There are two instances in which the compensation delay of Equation (6) will be less than the conventional compensation delay, which is the sum of Equations (2) and (3). The adaptive compensation of Equation (6) will be less than the compensation delay total if (i.e. $\text{Delay}_{encode}^{visual} > \text{Delay}_{encode}^{audio}$) and ($\text{Delay}_{decode}^{visual} < \text{Delay}_{decode}^{audio}$). The other instance is one in which ($\text{Delay}_{encode}^{visual} < \text{Delay}_{encode}^{audio}$) and ($\text{Delay}_{decode}^{visual} > \text{Delay}_{decode}^{audio}$). If one of these conditions does not exist, the adaptive compensation will be equal to the sum of the two fixed compensations of the conventional systems and methods. The adaptive compensation of Equation (6) will not be greater than the compensation provided by the conventional system and methods.

I claim:

1. A method of synchronizing video data and audio data within intersystem communications comprising steps of:

forming separate video and audio signals at an originating system;

processing a video signal along a video path of said originating system and processing an audio signal along an audio path of said originating system for transmission of video and audio data to a remote site, wherein processing said video and audio signals introduces dissimilar delays to said video and audio data;

forming delay data that are indicative of dissimilarity of said delays to said video and audio data;

transmitting said video, audio and delay data to a receiving system that is remote from said originating system;

processing said video and audio data along video and audio paths of said receiving system, wherein said video and audio paths of said receiving system introduce dissimilar delays; and adaptively introducing a compensation delay to one of said video and audio data at said receiving system in response to said delay data from said originating system and to dissimilarity of said delays at said receiving system, including selecting said compensation delay to at least partially offset a difference between audio data delay and video data delay introduced via a combination of said originating and receiving systems.

2. The method of claim 1 wherein said step of forming separate video and audio signals is a step of forming visual telephone communication signals, each of said originating and receiving systems being visual telephone systems.

3. The method of claim 1 wherein said step of processing said video and audio signals along said video and audio paths of said originating system is a step that includes encoding and compressing each of said signals and introducing inherent delays to said signals, with an inherent delay to a first one of said signals being greater than an inherent delay to a second one of said signals.

4. The method of claim 3 wherein said step of forming said delay data includes forming a compensation signal responsive to a magnitude of the difference between said inherent delays of said originating system.

5. The method of claim 4 wherein said step of forming said compensation signal includes defining a polarity based upon which of said video and audio signals is introduced with a greater inherent delay.

6. The method of claim 1 further comprising steps of forming delay data at said receiving system and transmitting said delay data to said originating system such that said originating system is enabled for introducing a compensation delay to one of said video and audio signals transmitted to said originating system from said receiving system.

7. A method of implementing lip synchronization for audio-visual communications between first and second visual telephone terminals, each having an encoding circuit for encoding audio and video signals to be transmitted and each having a decoding circuit for decoding received audio and video signals, said method comprising steps of:

exchanging transmitted information between said first and second terminals regarding relationships of audio signal delay to video signal delay;

based upon said information regarding said relationships, determining a difference between a sum of audio signal delay and a sum of video signal delay through circuits of said first and second terminals; and in response to determination of said difference, introducing lip-synchronization delays to offset said difference for exchanges of audio-visual information between said first and second terminals, such that for each exchange of audio-visual information there is a single lip-synchronization delay.

8. The method of claim 7 wherein said step of exchanging transmitted information regarding said relationships is a step in which each terminal of said first and second terminals forms and transmits delay data indicative of a difference between an audio encoding delay and a video encoding delay inherent to the encoding circuit of said each terminal.

9. The method of claim 8 further comprising a step of exchanging said audio-visual information in a nonsynchronous manner with respect to audio data and video data.

10. The method of claim 9 wherein said step of introducing lip-synchronization delays is limited to implementation at said decoding circuits.

11. The method of claim 8 further comprising compressing said audio and visual signals at said encoding circuits and decompressing said audio and visual signals at said decoding circuits.

12. A system for exchanging video and audio data with any of a plurality of other systems located at remote sites comprising:

means for generating separate video and audio signals;

circuit means, connected to said means for generating, for processing said video and audio signals for transmission, said circuit means having a video path and audio path, each having a generally fixed signal delay;

differencing means, connected to said circuit means, for generating delay data indicative of a difference between said signal delay along said video path and said signal delay along said audio path;

means, connected to said circuit means and differencing means, for transmitting said delay data and said processed audio and video signals to a remote system;

means for receiving audio and video signals at remote systems and for introducing system-unique delay data indicative of a difference between audio and video delays at said remote systems; and adaptive means, connected to said means for receiving, for delaying one of said received audio and video signals at a particular one of said remote systems in partial response to said delay data and system-unique delay data related to said particular one, thereby providing synchronization of said received audio and video signals.

13. The system of claim 12 wherein said means for transmitting is connected to a telephone network for communication with said remote systems.

14. The system of claim 12 wherein said circuit means is an encoding and signal compression circuit.

15. The system of claim 12 wherein said adaptive means includes a control circuit and a variable delay circuit that is responsive to said control circuit.

16. The system of claim 12 wherein said means for generating video and audio signals includes video and audio input/output equipment.

17. The system of claim 12 wherein said means for transmitting includes a multiplexer for transmitting audio, video and delay data in a single bit stream.

\* \* \* \* \*